United States Patent [19]

Lewis, Jr. et al.

[11] Patent Number: 4,686,570
[45] Date of Patent: Aug. 11, 1987

[54] ANALOG-TO-DIGITAL CONVERTER AS FOR AN ADAPTIVE TELEVISION DEGHOSTING SYSTEM

[75] Inventors: Henry G. Lewis, Jr., Hamilton Square; Sheau-Bao Ng, Plainsboro, both of N.J.

[73] Assignee: RCA Corporation, Princeton, N.J.

[21] Appl. No.: 813,255

[22] Filed: Dec. 24, 1985

[51] Int. Cl.[4] .............................................. H04N 5/40
[52] U.S. Cl. .................................... 358/188; 358/23; 358/160; 455/314
[58] Field of Search ............ 358/188, 160, 167, 191.1, 358/21 R, 23, 13; 455/182, 192, 196, 208, 216, 255, 256, 313, 314

[56] References Cited

U.S. PATENT DOCUMENTS

| | | | |
|---|---|---|---|
| 3,760,094 | 9/1973 | Skerlos | 358/23 |
| 4,500,912 | 2/1985 | Bolger | 358/31 |
| 4,502,078 | 2/1985 | Steckler et al. | 358/188 |
| 4,542,408 | 9/1985 | Lewis, Jr. | 358/167 |

OTHER PUBLICATIONS

Thedick, H. Adaptive Multipath Equalization for T.V. Broadcasting, IEEE Trans. on Cons. Elect. 5/77, pp. 175–181.

Orfanidis, S. J. Optimum Signal Processing, An Introduction, pp. 278–289 (1985).

*Primary Examiner*—Tommy P. Chin
*Attorney, Agent, or Firm*—E. M. Whitacre; P. J. Rasmussen; K. N. Nigon

[57] ABSTRACT

A digital television signal deghosting system includes an IIR filter responsive to the in-phase and quadrature-phase components of modulated television signals for cancelling ghost signals irrespective of their phase. A double-conversion tuner develops modulated composite video signals having a $3f_c$ carrier frequency. An analog-to-digital converter responsive to a two-phase $3f_c$ clock signal develops digital samples which alternately represent the baseband in-phase and quadrature-phase components of the modulated video signals. These samples are separated to develop digital signals representing the in-phase and quadrature-phase components of the modulated television signals.

3 Claims, 9 Drawing Figures

ANALOG-TO-DIGITAL CONVERTER AS FOR AN ADAPTIVE TELEVISION DEGHOSTING SYSTEM

This invention relates to analog-to-digital converting apparatus for use in a digital television ghost cancellation system which automatically adapts to the phase and amplitude of the ghost signals.

Television reception has long been plagued by multipath distortion, the reception of undesired multiple signals. These undesired signals, reflected from buildings and other large objects or resulting from poorly terminated cable networks, appear as delayed versions of the direct television signal, and are commonly referred to as ghost signals in the reproduced image.

As set forth in the paper entitled "Adaptive Multipath Equalization For T.V. Broadcasting", IEEE Transactions on Consumer Electronics, May 1977, pp. 175-181, by H. Thedick, and hereby incorporated by reference, the transmission path which produces a ghost signal may be modeled as a feed-forward system in which the direct signal is reduced in amplitude by an attenuation factor, H, and delayed by an interval of time, T, to form a ghost signal. The transfer function, TG, of a transmission path which produces a single ghost may be represented in Z transform notation as:

$$TG = 1 + HZ^{-K}. \qquad (1)$$

The equation 1 assumes a sampled data system in which $Z^{-K}$ represents a delay of K sample periods and approximates the time interval T. A simple algebraic manipulation of the equation (1) yields:

$$TG = (Z^K + H)/Z^K. \qquad (2)$$

To correct for the distortion introduced by the transmission channel, it is desirable for the ghost cancellation system to have a transfer function, TC, which may be represented in Z transform notation as:

$$TC = Z^K/(Z^K + H) \qquad (3)$$

or $$TC = 1/(1 + HZ^{-K}). \qquad (4)$$

It is noted that the transfer function represented by the equation 4 describes a feedback system commonly referred to as an infinite impulse response (IIR) filter.

The ghost signals are delayed from the direct signal as a function of the relationship of the signal path lengths between the direct and the ghost signals. The randomness of this relationship from one receiver location to another dictates that the phase of the ghost carrier signal may have any relationship to the phase of the direct signal. In order to fully remove the ghost signal from the direct signal, it is necessary to consider both the delay of the ghost signal and its carrier phase relative to that of the direct television signal.

Figure 1:
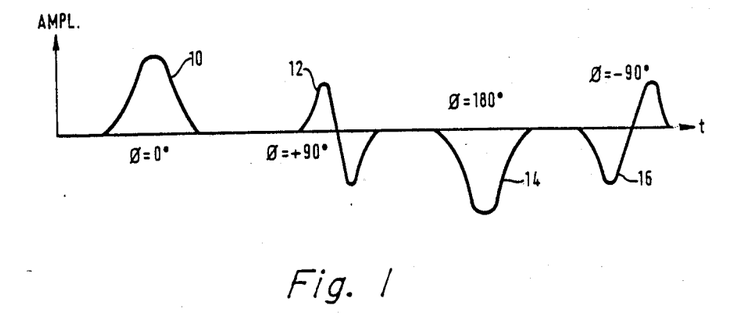
FIG. 1 (referred to above) is a waveform diagram of arbitrary ghost signals relative to a direct signal useful in describing the present invention.

FIG. 1 illustrates the importance of the relative phases of the direct and ghost signals. When, for example, the direct signal is a 2T pulse, represented by waveform 10, the ghost signal may be represented by the waveforms 10, 12, 14 or 16 if the relative phase angle between the direct carrier signal and the ghost carrier signal is 0°, 90°, 180° or −90° (270°) respectively. Furthermore, since the relationship of the direct and ghost signal paths is random, any intermediate waveform is also a possibility.

The relative amplitude and phase information of the direct and ghost signals can be determined by demodulating the television signal into in-phase (I) and quadrature (Q) components. The I component being in-phase with the picture carrier of the television signal and the Q component being in-phase with a signal that is phase shifted by 90° relative to the picture carrier. These components describe the television signal in the complex plane where the I and Q components correspond to coordinates along the real and imaginary axes respectively. The convention of referring to the in-phase and quadrature components of the video signals as real and imaginary components respectively is used throughout this application. As set forth below, these I and Q components may be used with a complex IIR filter (i.e. one which has real and imaginary filter coefficients) to effectively cancel the ghost signal components of a television signal.

Conventionally, the baseband I and Q components of a modulated video signal are obtained using two synchronous demodulators. If these signals are needed in digital form, two analog-to-digital converters (ADC's), one for each synchronous demodulator, may also be required.

SUMMARY OF THE INVENTION

The present invention is embodied in analog-to-digital converting apparatus which, responsive to modulated television signals develops first and second baseband signals that are respectively in-phase with and quadrature phase related to the carrier signal of the modulated television signals. The invention includes a clock signal generator which develops first and second clock signals that are substantially in-phase with and quadrature phase related to said carrier signal, respectively. An ADC responsive to the first and second clock signals samples the modulated video signals to develop samples which alternately represent the in-phase and quadrature-phase components of the modulated television signals.

The following theoretical analysis of the methods used by the present system to remove ghosts is presented as an aid in understanding the operation of the systems shown in FIGS. 2-7.

Under the NTSC standard, television signals are transmitted in vestigal sideband form. The relatively low frequency components of the baseband signal (from 0–1.25 MHz) are double sideband modulated (DSM) while the higher frequency components (from 1.25 to 4.75 MHz) are single sideband modulated (SSM). The quadrature components of the two sidebands of the DSM portion of the signal are mutually cancelling, so the quadrature component of the DSM video signals is substantially zero. The quadrature components of the SSM portion of the signal, however, are non-zero and may interfere, as a ghost signal, with the in-phase portion of the modulated video signal as explained above in reference to FIG. 1.

Analytically, the in-phase and quadrature components of the modulated video signal, S(t), may be represented by a complex baseband equivalent defined by the equation:

$$S(t) = S_I(t) + jS_Q(t) \tag{5}$$

where j is the complex quantity representing the square root of $-1$ and $S_I(t)$ and $S_Q(t)$ are the baseband signals which would be obtained if the signal S(t) were synchronously demodulated using signals that are respectively in-phase with and quadrature phase related to the picture carrier signal. The signal S(t) is applied to a multipath transmission channel to produce a ghost distorted signal R(t). As set forth above and in the Thedick reference, a single ghost signal may be substantially canceled from the signal R(t) by a recursive filter having a transfer function, TC, which may be represented in Z transform notation by the equation 4:

$$TC = 1/(1 + HZ^{-K}). \tag{4}$$

For multiple ghosts, this equation may be expanded to:

$$TC = 1 / \left( 1 + \sum_{K=1}^{M} h_K Z^{-K} \right) \tag{6}$$

since S(t) and R(t) are complex signals, it is desirable to use a complex deghosting filter, which is to say a filter having complex coefficients. Accordingly, each of the coefficients $h_K$ satisfies the equation:

$$h_K = a_K + jb_K. \tag{7}$$

Assuming that the relative delays, $Z^{-1}$ through $Z^{-M}$, of each of the ghost signals are known, the filter coefficients $h_1$ through $h_M$ are developed using an adaptive algorithm similar to the Widrow-Hoff least mean square algorithm described at section 6.3 of a textbook entitled *Optimum Signal Processing: An Introduction*, by S. J. Orfanidis, which is hereby incorporated by reference. In the deghosting processor described below, all of the coefficients are initially set to zero when the receiver is tuned to a channel for which the deghosting filter coefficients have not yet been calculated. During the first several field periods thereafter, each of the coefficient values is calculated by successively updating the existing coefficient values. The coefficient values are updated once per field in response to a training signal developed during the interval between the sixth equalization pulse and the first serration of the vertical sync pulse. The first part of the waveform has a duration of 0.46 times the horizontal line period (0.46H) and a nominal amplitude of 0 IRE units. The second part of the waveform, after the leading edge of vertical sync, has a duration of 0.43H and a nominal amplitude of $-40$ IRE units. It is assumed that, in the absence of noise, any deviation from $-40$ IRE units in the second part of the waveform is the result of a ghost signal that is a delayed, attenuated, and possibly phase shifted version of the leading edge of vertical sync.

During the second part of the training signal waveform, the in-phase and quadrature components of the signal R(t), $r_I(t)$ and $r_Q(t)$ respectively, are applied to the filter for correction. The corrected signals provided by the filter ($\hat{s}_I(t)$ and $\hat{s}_Q(t)$) are then subtracted from respective 40 IRE and 0 IRE reference values. The values of these difference signals, at time delay intervals relative to the step transition corresponding to ghost signals, provide a measure of the error in the values of the filter coefficients. These error signal values are used to update the coefficients according to an algorithm which may be represented by the following equation:

$$h_K(i+1) = h_K(i) + 2\mu\ (\hat{s}_i n) - s_{REF})\hat{s}^*_i(n - K). \tag{8}$$

In this equation, the terms $h_K(i+1)$ and $h_K(i)$ are complex values which represent the respective new and current values of the filter coefficients associated with a particular $Z^{-K}$ delay term. The factor $\mu$ is a scalar adaptation constant which may, for example, have a value of $2^{-14}$. This value represents a compromise between fast convergence to optimum coefficient values (large $\mu$) and small error in the values upon convergence (small $\mu$). The term $\hat{s}_i(n)$ is a complex value representing the current in-phase and quadrature sample values developed by the deghosting filter, i.e. the corrected sample values generated using $h_K(i)$, the current approximation of the filter coefficient $h_K$. The term $s_{REF}$ is a complex value representing the in-phase and quadrature values of the second part of the training signal in the absence of ghost signals. The factor $\hat{s}^*_i(n-K)$ is the complex conjugate (indicated by the superscript $^*$) of the sample values $\hat{s}_i(n-K)$ which occurred K sample periods before the present sample period, n. For a ghost signal delayed by K sample periods relative to the leading edge of the vertical sync pulse, the in-phase and quadrature sample values of $\hat{s}_i(n-K)$ represent the values of the vertical sync waveform which correspond to the ghost signal components of the samples $\hat{s}_i(n)$.

The process of updating the coefficient values continues until the magnitude of the corresponding error values ($\hat{s}_i(n) - s_{REF}$) falls below a predetermined threshold. The value of this threshold is a function of the magnitude of the signal R(t) and of its signal to noise ratio. If any of the error values does not converge to be less than the predetermined threshold, this may be an indication that the deghosting filter is unstable. Instability may occur, for example, when the level of the ghost signal is greater than the level of the direct signal. If a non-converging error value is detected, the filter coefficients $h_K$, corresponding to that error value are desirably set to zero.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital signal processing circuit design would know where such delays would be needed in a particular system.

Figure 2:
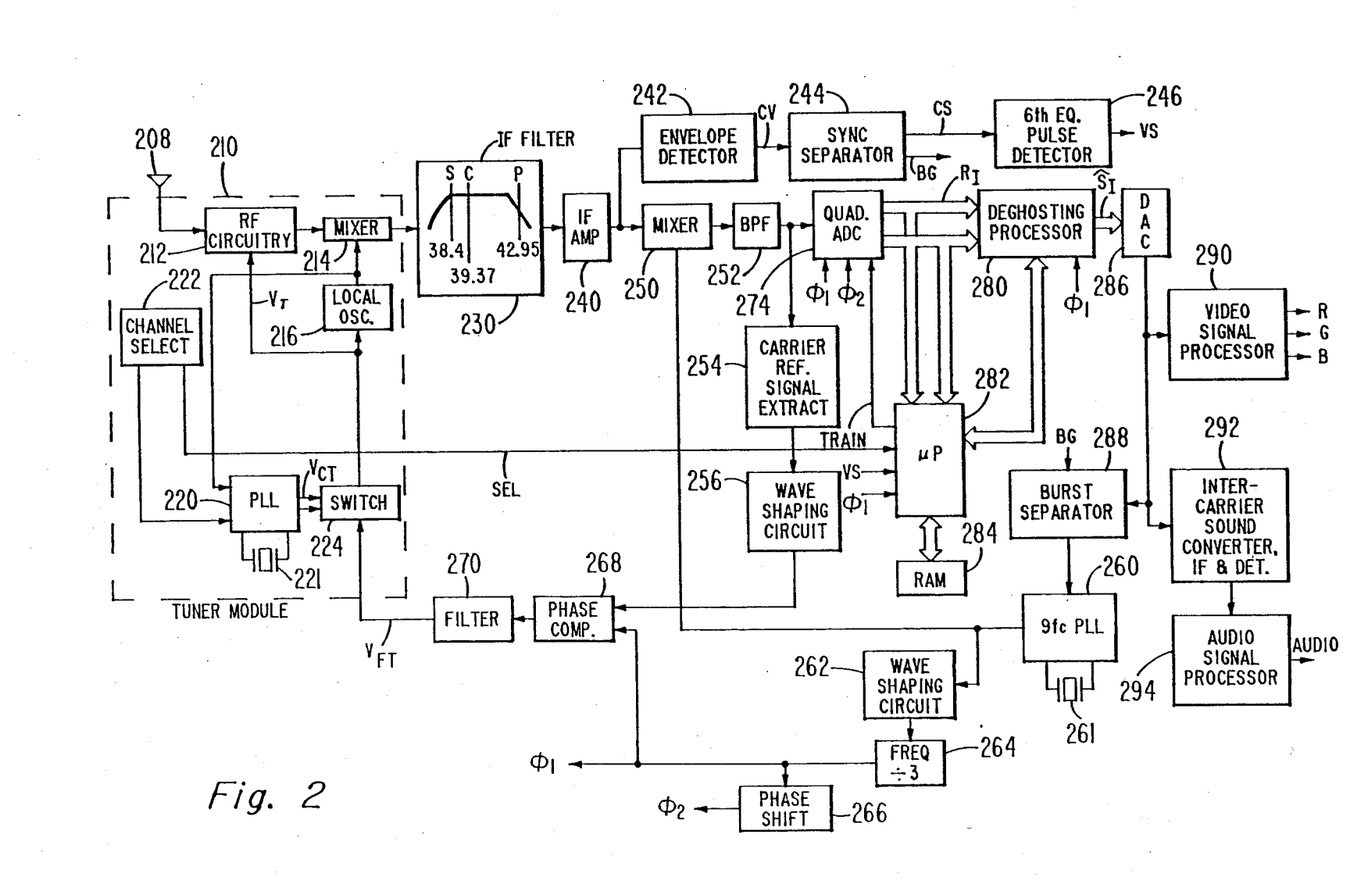
FIG. 2 is a block diagram of a television receiver incorporating the present invention.

Referring to FIG. 2, the signal processing section of a television receiver is shown. Radio frequency (r.f.) signals are received by an antenna 208 and applied to r.f. circuitry 212 of a tuner module 210. The r.f. circuitry 212 includes frequency selective and amplification circuits which provide amplified r.f. signals to one input of a first detector or mixer 214. Channel selection circuits 222 in the tuner module produce digital signals corresponding to the selected channel. The digital signals control a phase-locked loop (PLL) 220 to produce a coarse tuning voltage, $V_{CT}$, for controlling a local oscillator 216 so that its frequency bears a proportional relationship, determined by the channel number, to a reference frequency produced by a crystal oscillator indicated by crystal 221. The tuning voltage, $V_{CT}$ is coupled by way of a switch 224 to inputs of the r.f. circuitry 212 and the local oscillator 216. The tuning voltage $V_{ct}$ applied to the r.f. circuitry 212 adjusts the tuning of the frequency selective circuits for the selected television channel, in tracking relationship with the frequency of the local oscillator 216. The local oscillator 216 provides an oscillatory signal for the mixer 214 which heterodynes the r.f. signal of the selected television channel to a specific i.f. frequency band. In the present embodiment, for example, the picture carrier of the i.f. signal is at a frequency of $12f_c$, where $f_c$ corresponds to the frequency of the NTSC color subcarrier. Once the coarse tuning voltage $V_{CT}$ has tuned the local oscillator for reception of a desired channel signal, control of the local oscillator 216 is then maintained by a fine tuning voltage $V_{FT}$. The fine tuning voltage, $V_{FT}$ is selectively applied to the local oscillator by the switch 224. Switch 224 is controlled by the PLL 220 to apply $V_{FT}$ to the local oscillator when the PLL 220 has achieved coarse lock. A tuning system of this type is described in greater detail in U.S. Pat. No. 4,031,549 entitled "Television Tuning System with Provisions for Receiver RF Carrier at Nonstandard Frequency" which is hereby incorporated by reference.

The signals produced by the mixer 214, now at television intermediate frequencies, are applied to an i.f. filter 230. The i.f. filter 230 shapes the response characteristic for the i.f. signals of the selected television channel. The response characteristic of the i.f. filter 230 is shown in FIG. 2. Signals above and below the limits of the i.f. passband are attenuated by the i.f. filter.

The i.f. signals passed by the i.f. filter are applied to an i.f. amplifier 240. The amplified intermediate frequency signals from i.f. amplifier 240 are applied to a conventional envelope detector 242 which develops a baseband composite video signal CV. A conventional sync separator circuit 244 is responsive to the signal CV to remove the composite synchronization signal, CS, from the composite video signal and to separate it into component horizontal and vertical deflection synchronization signals. The sync separator circuitry 244 also produces a burst gate signal, BG, which may be used to extract the color synchronizing burst signal components from each horizontal line of video signal.

A detector 246, responsive to the composite synchronization signal, CS, detects the last (sixth) pre-equalization pulse preceding the vertical synchronization pulse interval. The circuitry 246 produces an output pulse signal, VS, which substantially coincides with the sixth pre-equalization pulse of each field of the composite video signal. As set forth above, this pulse may be used to locate a training signal which may be used to adjust the coefficients of the deghosting filter.

The signals provided by the i.f. amplifier 240 are also applied to a mixer 250 which heterodynes the i.f. signal with an oscillatory signal developed by a PLL 260. PLL 260, described below, generates a sinusoidal signal having a frequency substantially equal to $9f_c$ (nine times the frequency of the NTSC color subcarrier signal) and locked in phase to the color synchronizing burst component of the composite video signal. The mixer 250 translates the i.f. frequency band to lower frequencies such that the frequency of the translated picture carrier is substantially equal to $3f_c$. These translated signals are applied to a band-pass filter 252 which substantially attenuates any signal components having frequencies at $9f_c$, $12f_c$ or $21f_c$.

The signals from filter 252 are applied to carrier reference signal extractor circuitry 254. Circuitry 254, which may, for example, include frequency selective circuitry tuned to $3f_c$, produces a signal having a substantially frequency and phase locked relationship with the $3f_c$ picture carrier signal. The extracted carrier signal is converted into a square wave signal by wave shaping circuitry 256 which may, for example, include a hard limiting amplifier. The $3f_c$ square wave corresponding to the picture carrier signal is applied to one input terminal of phase detector circuitry 268 and a $3f_c$ clock signal phase $\phi_1$, developed from the $9f_c$ signal provided by the PLL 260 as explained below, is applied to the other input terminal. The phase detector 268 provides an output signal which is proportional to the difference in phase between the carrier signal and the $3f_c$ clock signal phase $\phi_1$. This signal is applied to a filter 270 which develops the control signal, $V_{FT}$, for the tuner module 210. The signal $V_{FT}$ adjusts the frequency of the local oscillator 216 to keep the i.f. carrier signal produced by the mixer 214 locked in phase to the color burst reference signal component of the received composite video signals, or in the absence of a color burst reference signal, to the free running $9f_c$ signal produced by the PLL 260.

Modulated composite video signals from the band-pass filter 252 are coupled to a quadrature analog-to-digital converter (ADC) 274. The clock signal phases $\phi_1$ and $\phi_2$ and a signal TRAIN which indicates when a training signal is being processed are also applied to the ADC 274. In the present embodiment, the clock signal phases $\phi_1$ and $\phi_2$ have frequencies substantially equal to $3f_c$, are quadrature phase related and have 12.5% duty cycles. The quadrature ADC 274 produces two digital signals, $R_I$ and $R_Q$, representing the respective in-phase and quadrature phase baseband components of the modulated composite video signal.

In conventional digital video signal processing systems, the range of values which may be handled by an ADC is generally set such that the signal amplitude corresponding to maximum white levels (100 IRE) is at one end of the range and the amplitude corresponding to the tip of sync ($-40$ IRE) is at the other end. In the present embodiment of the invention, the second part of the training signal waveform is nominally at the sync tip value. A strong ghost may have the effect of producing an amplitude value that exceeds than the sync tip value and, so, is outside of the range of signals which may be handled by the ADC. The resultant digital signal values may cause an overflow condition or may be clipped at a value approximating the tip of sync. In either situation, the amplitude of the ghost signal is not adequately represented. The quadrature ADC 274 used in the present embodiment avoids this problem by shifting the amplitude of the signals provided to the ADC when the training signal is being processed. Accordingly, ghost signals having magnitudes greater than sync tip are properly represented. Shifting the amplitude of these signals so that 0 IRE corresponds to the value zero in twos complement representation has the further advantage of simplifying the arithmetic circuitry used in the deghosting processor 280.

Figure 3:
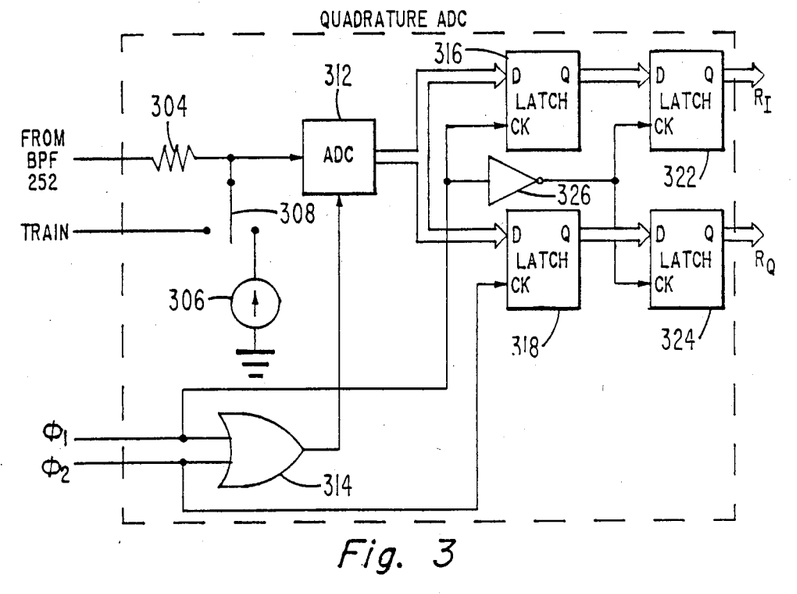
FIG. 3 is a block diagram, partially in schematic diagram form, of a quadrature analog-to-digital converter suitable for use in the television receiver shown in FIG. 2.

FIG. 3 is a block diagram of a quadrature ADC suitable for use with the television receiver shown in FIG. 2. The $3f_c$ modulated video signals provided by bandpass filter 252 are coupled to a conventional ADC 312 via a resistor 304. During the training signal interval a constant current source 306 is coupled to the interconnection of the resistor 304 and ADC 312 via switch 308. Switch 308 is controlled by the signal TRAIN, provided by the microprocessor 282. When switch 308 is closed, the current from source 306 flows throught the resistor 304 to develop a positive D.C. potential offset at the input to ADC 312. The value of this shift in amplitude may, for example, center the first part of the training signal in the range of amplitude values which may be processed by the ADC so that the O IRE first part of the training signal may be represented as a twos complement zero. This amplitude shift operation ensures that strong ghost signals are properly represented by the digital signals $R_I$ and $R_Q$.

The ADC 312, may, for example, be the TDC 1025 analog-to-digital converter manufactured by TRW Corporation. The clock signal applied to the ADC 312 is generated by logically ORing the $\phi_1$ and $\phi_2$ of the clock signal in the OR gate 314. Since the phases $\phi_1$ and $\phi_2$ are quadrature phase related $3f_c$ signals having a 12.5% duty cycle, the effective sampling rate of the ADC is $12f_c$ (42.95 MHz). Moreover, since the $3f_c$ carrier signal is aligned in phase with the $\phi_1$ phase of the clock signal, the ADC 312 alternately provides samples representing $R_I$ and $R_Q$, the baseband in-phase and quadrature-phase video signal components of the modulated video signal. Put another way, the ADC 312 samples the modulated video signals at the carrier frequency to translate the modulated signals into their in-phase and quadrature phase components. The $R_I$ components are strobed into the negative edge triggered latch 316 coincident with the trailing edges of pulses of the clock phase $\phi_1$ and the $R_Q$ components are strobed into the negative edge triggered latch 318 coincident with the trailing edges of pulses of the clock phase $\phi_2$. The sample values held by the latches 316 and 318 are simultaneously transferred to the respective negative edge triggered latches 322 and 324 coincident with the leading edges of the clock pulses $\phi_1$ provided by inverter 326. The digital samples $R_I$ and $R_Q$ are available at a $3f_c$ rate at the output ports of the respective latches 322 and 324.

Although the ADC 312 of the quadrature ADC circuitry shown in FIG. 3 operates at an effective rate of $12f_c$, the circuitry is preferred over a single ADC operating in a system that has a clock frequency of $12f_c$. Since the circuitry shown in FIG. 3 uses a two phase, $3f_c$ clock signal, greater tolerances are allowed for the associated circuitry, and potential radio-frequency interference (RFI) problems are reduced relative to a system which uses a $12f_c$ clock.

It is contemplated that the ADC 312 may be replaced by a sample and hold circuit operating at an effective $12f_c$ rate under control of the ORed clock signal phases $\phi_1$ and $\phi_2$ and an ADC which operates at a rate of $6f_c$. In this arrangement, the ADC may be clocked by a $3f_c$ signal having a 50% duty cycle. Samples from the sample and hold circuitry would be strobed into the ADC on the transition of the clock signal.

Referring once more to FIG. 2, the digital signals $R_I$ and $R_Q$ are applied to a deghosting processor 280 and to a microprocessor 282. As set forth below, the deghosting processor 280, under control of the microprocessor 282, filters the ghost-contaminated signals $R_I$ and $R_Q$ to produce a signal $\hat{s}_I$ which approximates the in-phase component of the direct signal to the substantial exclusion of any ghost signals. The signal $\hat{s}_I$ is applied to a digital-to-analog converter (DAC) 286, which produces an analog baseband composite video signal, CV, representing the digital signal $\hat{s}_I$.

This analog composite video signal provided by DAC 285 is applied to a conventional burst separator 288 which is responsive to the burst gate signal, BG, provided by the sync separator circuitry 244 for separating the color synchronizing burst components from each horizontal line of the composite video signal. The separated burst signals are applied to the PLL 260 which includes a resonant crystal 261 having a resonant frequency of, for example, $9f_c$. The PLL 260 is controlled by the burst signals to provide the sinusoidal $9f_c$ output signal that is applied to the mixer 250 as set forth above. The $9f_c$ signal is also applied to wave shaping circuitry 262 which may include a hard-limiting amplifier for producing a $9f_c$ square wave signal. The $9f_c$ square wave is applied to frequency-divide-by-three circuitry 264 which produces the square wave clock signal phase $\phi_1$ having a frequency substantially equal to $3f_c$ and a 12.5% duty cycle (i.e. in a logic one state for 23 ns and in a logic zero state for 79 ns). The signal $\phi_1$ is applied to the phase detector 268, as set forth above, and to phase shifting circuitry 266. The circuitry 266 develops the clock signal phase $\phi_2$ which is quadrature phase related to the clock signal phase $\phi_1$ and also has a 12.5% duty cycle. The clock signals $\phi_1$ and $\phi_2$ are applied to the quadrature ADC 274 as set forth above.

Composite video signals from DAC 286 are also applied to a conventional video signal processor 290 and to intercarrier sound converter, IF amplifier and detector circuitry 292. The video signal processor 290 may include, for example, circuitry to separate the luminance and chrominance components from the composite video signal and to process these components to produce red, green and blue primary color signals (R, G, and B respectively) for application to a display device (not shown). The intercarrier sound circuitry 292 may include a resonant tuned circuit for separating the 4.5 MHz sound carrier from the composite video signal, a 4.5 MHz if amplifier and an FM detector for developing an audio signal. The audio signal is applied to an audio signal processor 294 which produces an audio signal for application to a speaker (not shown).

Microprocessor 282 may be any one of a number of the currently available microprocessors which may include a direct memory access (DMA) instruction, standard arithmetic instructions and interrupt handling capabilities. The microprocessor 282 is coupled to a random access memory (RAM) 284 and is coupled to receive a signal SEL from the tuner module 210 indicating the currently selected channel, the signal VS provided by the sixth equalization pulse detector 246, the clock signal phase $\phi_1$, and various signals from the deghosting processor 280 as described below. Responsive to the pulse signal VS, the microprocessor 282 executes a DMA instruction to store 512 of the $R_I$ and $R_Q$ samples, occurring during the interval following the sixth equalization pulse, in the RAM 284. The 512 samples constitute approximately three-fourths of one horizontal line period of the incoming signal and include samples representing the leading edge of the vertical sync pulse. In the subsequent field period, the microprocessor examines these stored samples to find the leading edge of the vertical sync pulse. This transition marks the start of the training interval for generating the coefficients used by the deghosting filter. The initialization sequence of storing the samples following the VS pulse and examining the sample values to determine the timing of the leading edge of the vertical sync pulse may be repeated over several field intervals to increase the accuracy of the measurement. A second product of the initialization sequence are reference values $I_{REF}$ and $Q_{REF}$ representing the amplitude of the tip of the vertical sync pulse. These values, measured immediately after the step transition may also be averaged over several fields. The nominal values of $I_{REF}$ and $Q_{REF}$ are $-40$ IRE units and 0 IRE units respectively. The values of $I_{REF}$ and $Q_{REF}$ and a coefficient update signal, CU, are applied to the deghosting processor 280 by the microprocessor 282.

Figure 4:
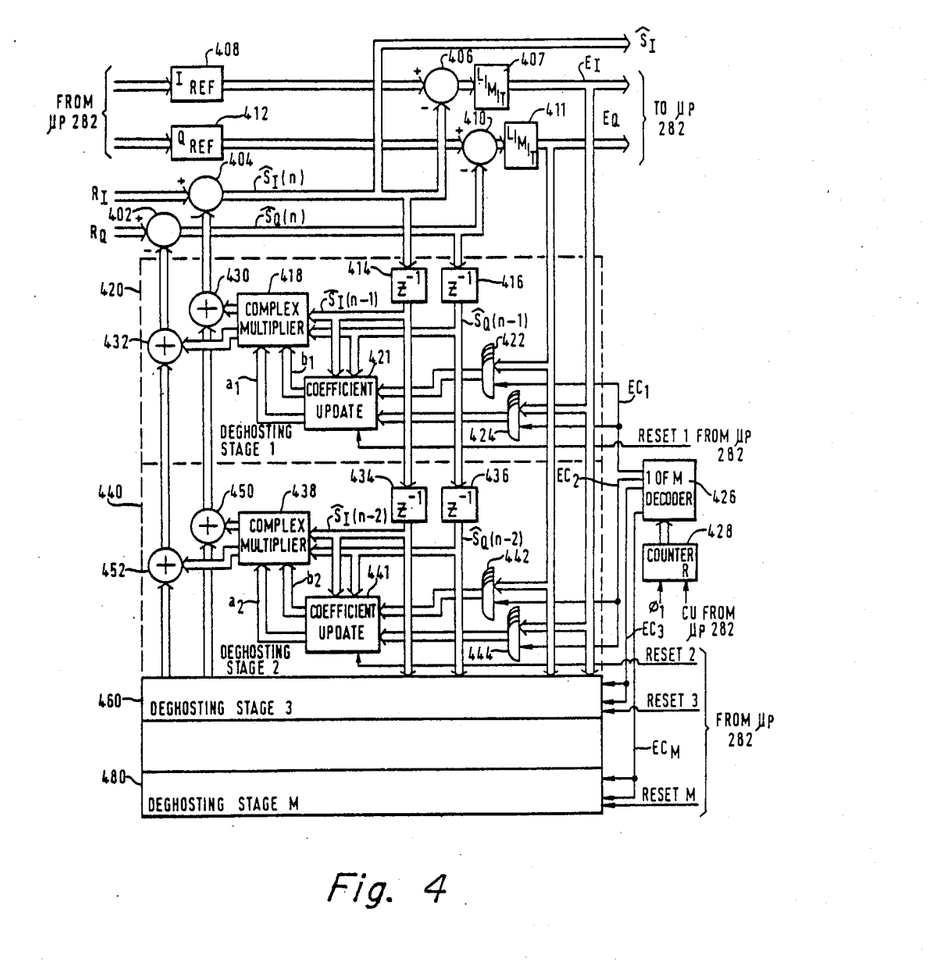
FIG. 4 is a block diagram of a recursive ghost correction filter suitable for use with the television receiver shown in FIG. 2.

FIG. 4 is a block diagram of an embodiment of the deghosting processor which includes one recursive filter stage for each of M (e.g. 256) successive sample periods that define the interval over which ghost signals may be corrected. In the figure, only the first three stages (420, 440 and 460) and the last stage (480) are illustrated. Each stage is a separate filter which corrects ghost signals that are delayed by a predetermined time relative to the direct signal. In general, the ith stage of the filter processes ghost signals that have relative delays of i periods of the clock signal CK. The processor shown in FIG. 4 has two operational modes, a coefficient update mode, in which optimum filter coefficient values are calculated using a training waveform, and a deghosting mode, in which video signals are processed using optimum coefficient values to remove multipath distortion. The M stages of the filter are identical, consequently, only one stage, 420, is described in detail.

The input signals $R_I$ and $R_Q$ from the quadrature ADC 279 are applied to the respective subtracters 404 and 402. In the deghosting mode, the subtracters 404 and 402 subtract in-phase and quadrature correction signals developed by the M filter stages from the signals $R_I$ and $R_Q$ respectively to develop respective signals $\hat{S}_I$ and $\hat{S}_Q$. These signals approximate the in-phase and quadrature components of the undistorted signal S applied to the transmission channel. The signal $\hat{S}_I$ is the output signal of the deghosting processor.

In the coefficient update mode, however, the filter coefficients are not at their optimum values, so the signals and $\hat{S}_I$ and $\hat{S}_Q$ provided by the subtracters 404 and 402 may include significant ghost signal components. Since the amplitude of the second part of the training signal should be constant and of known value, the amplitude of the ghost signal components can be determined as the difference between these known signal values and the signals $\hat{S}_I$ and $\hat{S}_Q$. The ghost signal components ($E_I$) of the signal $\hat{S}_I$ are measured by subtracting the values of $\hat{S}_I$ during the second part of the training signal from the reference value, $I_{REF}$, in subtracter 406, and then limiting the difference samples to have magnitudes less than 40 IRE in the limiting circuitry 407. Similarly, the subtracter 410 subtracts the $\hat{S}_Q$ samples from the reference value $Q_{REF}$ and limiting circuitry 411 limits the magnitudes of these difference values to be less than 40 IRE, to produce a signal $E_Q$ which represents the ghost signal components of the signal $\hat{S}_Q$. The signals $E_I$ and $E_Q$ may be referred to as error signals since they represent ghost signals which have not been removed by the deghosting filter. The signals $E_I$ and $E_Q$ are applied in parallel to each of the M stages of the deghosting filter to update the filter coefficients and to the microprocessor 282 which monitors the error signals, as set forth above, to ensure that the filter is stable. The values of $E_I$ and $E_Q$ for a single training signal may, for example, be transferred directly to the RAM 284 via a DMA instruction to the microprocessor 282.

Each of the signals $E_I$ and $E_Q$ includes one sample for each of M sample periods in the second part of a training signal. Each stage of the filter is responsive to a respectively different pair of these error samples while the filter coefficients are being updated. Each stage of the filter is enabled when its corresponding error signal values are available by a respectively different one of the enabling signals $EC_1$ through $EC_M$. As shown for the first stage, 420, the signal $EC_1$ is applied to a first input terminal of each of a number of AND gates 422 and 424. The second input terminals of the AND gates 422 are coupled to receive respectively different bits of the error signals $E_Q$ while the second input terminals of the AND gates 424 are coupled to receive respectively different bits of the error signals $E_I$. Thus, the error signal values $E_I$ and $E_Q$ are applied to the coefficient update circuitry 421 only when the signal $EC_1$ is a logic one.

The signals $EC_1$ through $EC_M$ are developed by a 1 of M decoder 426 in response to values provided by a counter 428. The counter 428 is enabled by a signal CU, provided by the microprocessor 282, to count pulses of the clock signal phase $\phi_1$. The signal CU is a logic zero, enabling the counter, only during the second part of the training signal and only while coefficients are being updated. When CU is a logic 1, a counter value of 0 is applied to the decoder 426 and all of the output signals $EC_1$ through $EC_m$ have values of logic zero.

Following the leading edge of vertical sync, during the coefficient update period, the counter is enabled and its value is incremented by successive pulses of the clock signal phase $\phi_1$ from 1 to M. The counter values are applied to the decoder 426 causing the corresponding output signals of the decoder, $EC_1$ through $EC_M$ to switch from logic zero to logic one for one period of the clock signal phase $\phi_1$. The timing of the signals $EC_1$ through $EC_M$ is controlled by the microprocessor 282 so that the error signal values, $E_I$ and $E_Q$, corresponding to the Kth sample period following the vertical transition are applied to the Kth filter stage when the corresponding enabling signal, $EC_K$, is a logic one.

In the first deghosting stage, 420, the error signals $E_I$ and $E_Q$ are applied to two input ports of coefficient update circuitry 421. The other two input ports of the circuitry 421 are coupled to receive the signals $\hat{S}_I$ and $\hat{S}_Q$ delayed one period of the clock signal phase $\phi_1$ by the delay elements 414 and 416 respectively. Each stage of the filter includes delay stages similar to 414 and 416 which are coupled to the corresponding delay elements of the previous stage so that the signals $\hat{S}_I$ and $\hat{S}_Q$ applied to each stage are delayed by successively greater numbers of clock periods. To avoid confusion in referring to the delayed or undelayed signals $\hat{S}_I$ and $\hat{S}_Q$, the samples of the signals $\hat{S}_I$ and $\hat{S}_Q$ available at the output ports of the subtracters 402 and 404 are referred to as $\hat{s}_I(n)$ and $\hat{s}_Q(n)$ while the samples provided by the delay elements of a given stage K are referred to as $\hat{s}_I(n-K)$ and $\hat{s}_Q(n-K)$. In the coefficient update mode, the sample values $\hat{s}_I(n-K)$ and $\hat{s}_Q(n-K)$ correspond to respective in-phase and quadrature sample values immediately following the step transition in the training waveform.

Desirably, the sample values $\hat{S}_I(n-K)$ and $\hat{S}_Q(n-K)$ used in the coefficient update algorithm have the same values for all of the filter stages. Accordingly, it is contemplated that constant values may be used in place of these signals or that a single pair of samples may be used for all of the filter stages.

Figure 5:
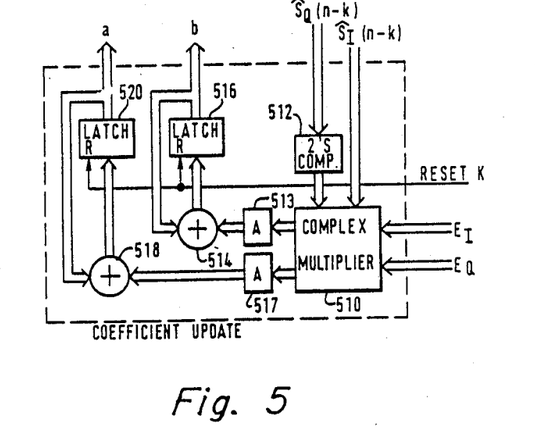
FIG. 5 is a block diagram of coefficient update circuitry suitable for use with the filter shown in FIG. 4.

FIG. 5 is a block diagram of coefficient update circuitry suitable for use with the present invention. The samples of the error signals $E_I$ and $E_Q$ are applied to one set of real and imaginary input ports of a complex multiplier 510. The sample value $\hat{s}_Q(n-K)$ is complemented by twos complementing circuitry 512. The sample $\hat{s}_I(n-K)$ and the complemented $\hat{s}_Q(n-K)$ form the complex conjugate of the complex value having real and imaginary terms $\hat{s}_I(n-K)$ and $\hat{s}_Q(n-K)$ respectively. This complex conjugate value is applied to the second set of input ports of the complex multiplier 510. The output signals of the multiplier 510 correspond to the complex product term $(\hat{s}_I(n) - S_{REF})\hat{s}_i^*(n-K)$ of the equation 8. The complex multiplier 510 may be identical to the one shown in FIG. 6, described below.

The real and imaginary components of the product provided by the complex multiplier 510 are applied to respective sample scaling circuits 517 and 513. The circuits 517 and 513 multiply the respective real and imaginary values by an adaptation constant A. In the present embodiment, the constant A may be, for example, $2^{-13}$ and corresponds to the factor $2\mu$ of equation 8. It is contemplated that the sample scaling performed by the circuits 513 and 517 may, alternatively, be implemented by using bit-lines of the output signals of the multiplier 510 that are more significant by 13 bit positions than the bit-lines that would be used if the sample scaling were done by separate circuitry (i.e. by shifting the output signals of the multiplier to less significant bit positions). Alternatively, the scaling may be performed in the complex multiplier 510, described below, between the multipliers and the adder/subtracter to reduce the complexity of the adder and subtracter.

The scaled real and imaginary (I and Q) samples from the respective circuits 517 and 513 are applied to the adders 518 and 514 respectively. The output ports of the adders 518 and 514 are coupled to the respective latches 520 and 516 which contain the previous coefficient values $$(h_k(i) = a_k(i) + jb_k(i))$$

and which provide the second input values to the adders 518 and 514 respectively. The values provided to the latches by the adders are the coefficient values $a_k(i+1)$ and $b_k(i+1)$ which constitute the complex coefficient $h_k(i+1)$. The coefficient update circuitry shown in FIG. 5 implements the coefficient update algorithm represented by equation 8.

The latches 516 and 520 have reset input terminals which are interconnected and coupled to a signal, RESET K. Referring, once more, to FIG. 4, each stage of the deghosting filter includes a reset input terminal, RESET 1 through RESET M, coupled to the microprocessor 282. As a part of the update algorithm, the microprocessor resets all of the latches (setting all of the coefficients to zero) before entering the coefficient update mode. The reset input terminals may also be used by the microprocessor to set a coefficient to zero if it is determined that the coefficient may cause the filter to be unstable.

The coefficient values $a_1$ and $b_1$ provided by the coefficient update circuitry 421 are applied to one set of real and imaginary input ports of a complex multiplier 418. The delayed samples $\hat{s}_I(n-1)$ and $\hat{s}_Q(n-1)$ are applied respectively to a second set of real and imaginary input ports of the multiplier 418. The complex multiplier 418 may, for example, be identical to the one shown in FIG. 6, described below. The real (in-phase) and imaginary (quadrature) values provided by the complex multiplier 418 represent the correction signals for ghost signals that are delayed by one period of the clock signal $\phi_1$ relative to the direct signal. In both the update and deghosting modes, each of the M stages of the deghosting filter produces an in-phase and a quadrature-phase correction signal to compensate for ghost signals which are delayed relative to the main signal by an amount of time substantially equal to the delay associated with the stage. That is to say, each stage, K, produces signals which correct for ghost signals that are delayed by K sample periods relative to the direct signal. The signals produced by each stage are combined with the corresponding signals from stages having greater delay values in a pair of adder trees. The adders 430 and 432 are nodes in the adder tree for the first deghosting stage 420. The in-phase and quadrature correction signals developed by the complex multiplier 418 are applied to the first input ports of the respective adders 430 and 432. The other input ports of the adders 430 and 432 are coupled to output ports of the adders 450 and 452 respectively. Adder 450 provides the combined in-phase correction signals from the stages 2 through M and adder 452 provides the combined quadrature-phase correction signals from the stages 2 through M. The signals developed by the adders 430 and 432 are the respective combined in-phase and quadrature-phase correction signals from the filter stages 1 through M. The combined in-phase correction signals are subtracted from the signal $R_I$ by the subtracter 404 to produce the signal $\hat{S}_I$, and the combined quadrature correction signals are subtracted from the signal $R_Q$ by the subtracter 402 to produce the signal $\hat{S}_Q$. Depending on the number of stages, M, used in the deghosting filter, the amount of delay provided by each stage may need to be adjusted to ensure that the correction signals developed by the stages have sufficient time to propagate through the adder tree for timely application to the subtracters 402 and 404.

Figure 6:
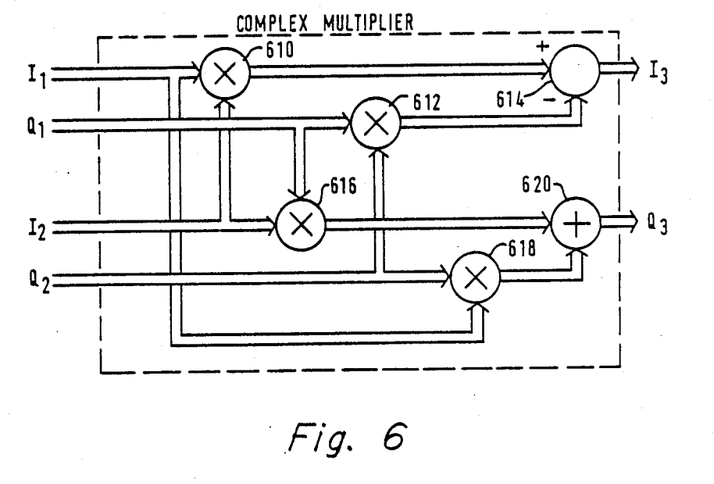
FIG. 6 is a block diagram of a complex multiplier suitable for use with the circuitry shown in FIGS. 4 and 5.

FIG. 6 is a block diagram of a complex multiplier suitable for use with the present invention. In FIG. 6, first real (in-phase) and imaginary (quadrature) values, $I_1$ and $Q_1$, are applied to respective multipliers 610 and 612, and the second real and imaginary values, $I_2$ and $Q_2$, are applied to multipliers 616 and 618 respectively. The multiplier 610 forms the product of $I_1$ and $I_2$ and applies the result to the subtracter 614. The multiplier 612 forms the product of $Q_1$ and $Q_2$ and applies the result to subtracter 614. The subtracter 614 subtracts the product of $Q_1$ and $Q_2$ from the product of $I_1$ and $I_2$ to produce the real output value $I_3$. The multipliers 616 and 618 form the products of $I_2$ and $Q_1$ and of $I_1$ and $Q_2$ respectively and apply these products to an adder 620 which sums the products to produce the imaginary output value $Q_3$.

As set forth above, the deghosting processor shown in FIG. 4 is controlled by the microprocessor 282. FIGS. 8A, 8B and 8C are flow charts which describe the respective control-flows of the microprocessor in its three modes of operation: initialization, coefficient update and deghosting.

Figures 7A, 7B, 7C:
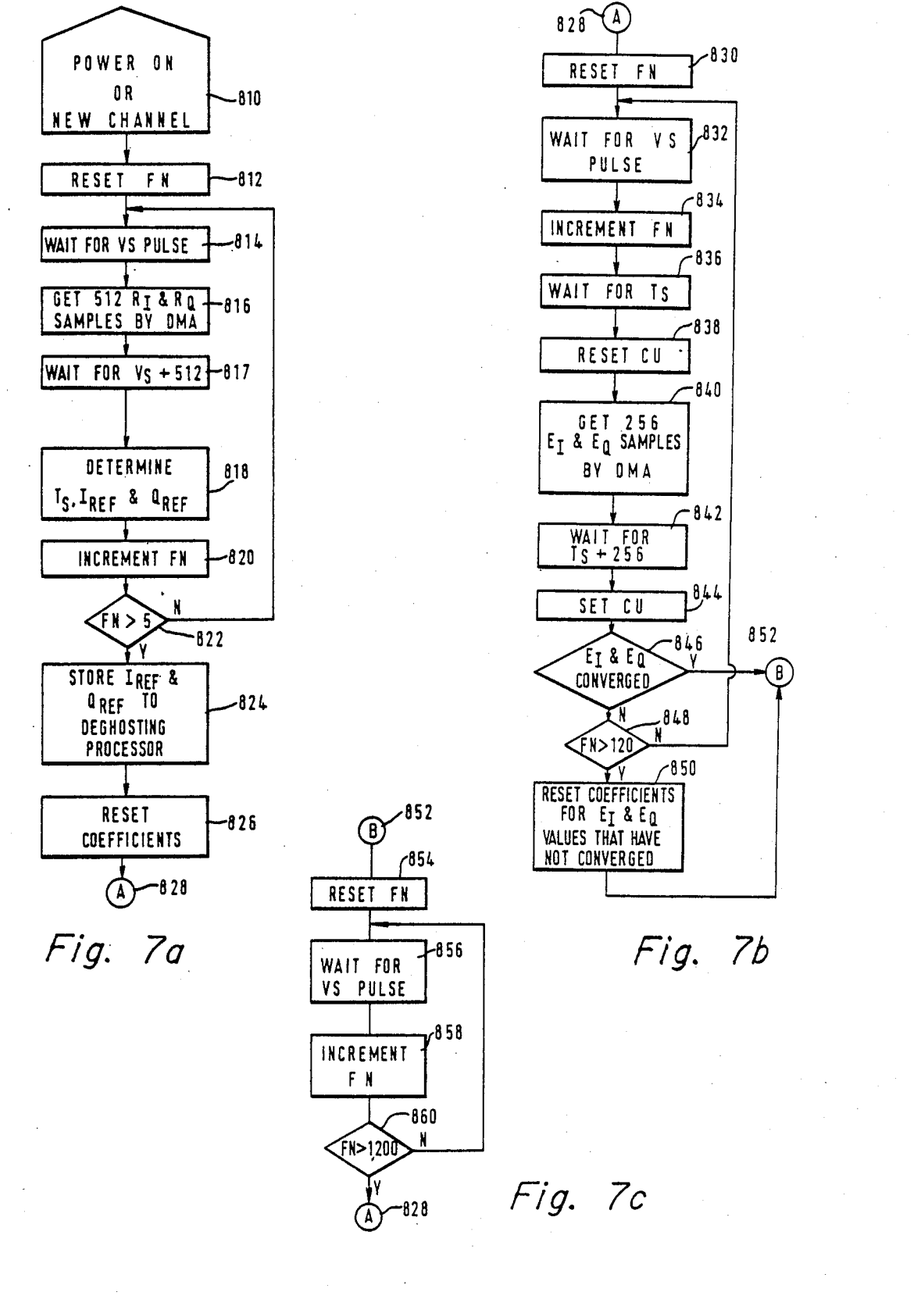
FIGS. 7A, 7B, and 7C are flow charts useful in explaining the operation of the microprocessor shown in FIG. 2.

In FIG. 7A, the microprocessor enters its initialization mode when power is applied to the receiver or when a new channel is selected, 810. An internal variable FN (mnemonic for field number) is set to zero, 812, and the microprocessor 282 waits, 814, for the VS pulse signal from the sixth equalization pulse detector 246. When the VS pulse occurs, the microprocessor 282 executes a DMA command, 816, to transfer 512 samples of each of the signals $R_I$ and $R_Q$ into predetermined locations of RAM 284. During the field period following the pulse VS, the microprocessor examines the stored samples, 818, to find the largest step transition in the in-phase samples, $R_I$. This transition is assumed to be the leading edge of the vertical sync pulse. The sample period immediately following the step transition marks the start of the second part of the training signal. The number of this sample period relative to the first stored $R_I$ sample defines the timing of the vertical sync pulse relative to the pulse VS. This sample number is stored in an internal variable $T_S$. The values of the samples $R_I$ and $R_Q$ occurring immediately after the transition are the values $I_{REF}$ and $Q_{REF}$ used by the deghosting processor as set forth above. The values of $T_s$, and $I_{REF}$ and $Q_{REF}$ are averaged over five field intervals to compensate for noise as illustrated by the control steps 820 and 822 and the branch to step 814. When these values have been determined the microprocessor stores the values of $I_{REF}$ and $Q_{REF}$ into the deghosting processor 824 and applies a pulse to the reset input terminal of each of the M filter stages, 826, to set their coefficient values to zero.

The step A, 828, in the control flow marks the end of the initialization mode and the start of coefficient update mode. In FIG. 7B, the first step 830 in the coefficient update mode is to reset the variable FN. The microprocessor then waits for the VS pulse, 832, and increments FN. After receiving the VS pulse, the microprocessor counts Ts pulses of the clock signal CK, 836, and resets the signal CU applied to the counter 428 of FIG. 4. When CU is zero, the deghosting processor updates its coefficient values. Simultaneously, the microprocessor, via a DMA instruction, 840, stores M=256 samples of each of the error signals $E_I$ and $E_Q$. When these samples have been obtained, 842, at sample period $T_s+256$, the microprocessor sets the signal CU to logic one, 844, terminating the coefficient update operations for this field. The stored values of $E_I$ and $E_Q$ are then checked, 846, by the microprocessor against corresponding values which have been previously processed to determine if all of the error values have converged to be less than a predetermined threshold value. It is contemplated that the microprocessor monitors the error values for a predetermined amount of time (e.g. 1 second) before determining convergence. This delay is desirable to ensure that none of the error values is oscillatory. If all of the values have converged, the control flow branches to step B, 852, which marks the end of the coefficient update mode and the start of the deghosting mode. If all of the error values have not converged after two seconds (120 field periods) 848, the microprocessor resets the coefficients corresponding to the possibly oscillatory or divergent error values, 850, and then branches to step B.

FIG. 7C represents the control flow for the deghosting mode. In this mode, the microprocessor resets the variable FN, 854, and, each field period 856, increments it, 858, until 1200 field periods have occurred (20 seconds) 860. When this happens, the microprocessor branches to step A, the start of coefficient update mode to further refine the previously calculated coefficients.

What is claimed is:

1. Apparatus for developing digital samples representing input signals which include a carrier signal modulated by baseband signals comprising:
   an input terminal for applying said input signals;
   means for developing a clock signal having a predetermined frequency, said clock signal having first and second phases that are mutually quadrature phase related;
   means, coupled to said input terminal and to said clock signal developing means, for processing said input signals to produce processed signals including a further carrier signal modulated by said baseband signals wherein said further carrier signal is substantially locked in frequency and phase to one of the first and second phases of said clock signal; and
   analog-to-digital converting means coupled to said input signal processing means and responsive to said first and second phases of said clock signal for alternately sampling said processed signals at instants determined by said first and second phases of said clock signal, respectively, to develop digital samples which alternately represent components of said processed signals that are respectively in-phase with and quadrature phase related to said further carrier signal.

2. The apparatus set forth in claim 1, further comprising:
   means, coupled to said analog-to-digital converting means, for separating alternate ones of the digital samples developed thereby to provide a first output signal representing the components of said input signals that are in-phase with said further carrier signal at a first output port and a second output signal representing the components of said input signals that are quadrature phase related to said further carrier signal at a second output port, wherein said first output signal represents said baseband signals.

3. Apparatus for developing digital samples representing radio frequency television signals including a carrier signal modulated by composite video signals, comprising:
   a terminal for applying said radio frequency television signals;
   means coupled to said terminal for heterodyning said radio frequency television signals and an oscillatory signal to produce further radio frequency television signals, including a further carrier signal modulated by said composite video signals, wherein the frequency of said further carrier signal is proportional to the difference in frequency between said carrier signal and said oscillatory signal, and responsive to a control signal for changing the frequency and phase of said oscillatory signal to change the frequency of said further carrier signal;

means for generating a further oscillatory signal having a predetermined frequency and first and second quadrature related phases;

means coupled to said heterodyning means and to said means for developing said further oscillatory signal for generating a phase difference signal proportional to the difference in frequency and phase between one of the first and second phase of said further oscillatory signal and said further carrier signal and for applying said phase difference signal to said heterodyning means as said control signal to change the frequency and phase of said oscillatory signal to condition said heterodyning means to produce said further radio frequency television signals such that said further carrier signal has a frequency and phase that is substantially equal to that of said oscillatory signal;

an analog-to-digital converter coupled to said heterodyning means and responsive to said first and second phases of said further oscillatory signal for alternately sampling said further radio frequency television signals at instants determined by the first and second phases of said further oscillatory signal respectively, to develop digital samples which alternately represent components of said further radio frequency television signals that are respectively in-phase with and guadrature phase related to said further carrier signal.

* * * * *